United States Patent
Zhang et al.

(10) Patent No.: US 7,147,386 B2
(45) Date of Patent: Dec. 12, 2006

(54) MEMS BASED HANDHELD FIBER OPTIC CONNECTOR CLEANER

(75) Inventors: Zhanxiang Zhang, San Jose, CA (US); Shijie Gu, Sunnyvale, CA (US)

(73) Assignee: Rainbow Communications, Inc, San Jose, CA (US)

( * ) Notice: Subject to any disclaimer, the term of this patent is extended or adjusted under 35 U.S.C. 154(b) by 0 days.

(21) Appl. No.: 11/050,480

(22) Filed: Feb. 2, 2005

(65) Prior Publication Data

US 2006/0171641 A1    Aug. 3, 2006

(51) Int. Cl.
G02B 6/36    (2006.01)
C03B 37/07    (2006.01)

(52) U.S. Cl. .............. 385/85; 385/53; 385/76; 385/77; 385/134; 385/137; 65/385; 65/379; 65/29.13; 65/29.15

(58) Field of Classification Search ............... 385/53, 385/14, 15, 16, 76, 77, 78, 85, 134, 136, 385/137, 138, 139; 65/385, 379, 29.13, 29.15
See application file for complete search history.

(56) References Cited

U.S. PATENT DOCUMENTS

| | | | |
|---|---|---|---|
| 678,868 A | 7/1901 | Gleason et al. | |
| 4,445,632 A * | 5/1984 | Margolin et al. | 225/2 |
| 5,117,528 A * | 6/1992 | Kanayama et al. | 15/210.1 |
| 5,906,686 A | 5/1999 | McNeil | 134/1 |
| 6,209,162 B1 | 4/2001 | Clairadin et al. | 15/97.1 |
| 6,209,163 B1 | 4/2001 | Clairadin et al. | 15/97.1 |
| 6,415,471 B1 | 7/2002 | Childers et al. | 15/210.1 |
| 6,449,795 B1 | 9/2002 | Sato | 15/210.1 |
| 6,466,723 B1 | 10/2002 | Miyake et al. | 385/134 |
| 6,648,980 B1 | 11/2003 | Childers et al. | 134/6 |
| 6,681,437 B1 | 1/2004 | Miyake et al. | 15/210.1 |

(Continued)

OTHER PUBLICATIONS

Non-Contact Fiber Optic Connector Cleaning System, Product Announcement, Westover Scientific, 38 pages [Retrieved from the Internet on Jan. 24, 2005 <<URL: http://www.simacelectronics.nl/content/downloads/westover/CleanBlast%20System.pdf>>].

(Continued)

Primary Examiner—Brian M. Healy
(74) Attorney, Agent, or Firm—Lumen Intellectual Property Services, Inc.

(57) ABSTRACT

A Micro-Electro-Mechanical System (MEMS) and double-layer nozzle based high efficiency, lightweight, low cost, compact, portable fiber-optic connector cleaning apparatus useful for various fiber optic communications applications such as fiber optic cable plant maintenance. The double-layer nozzle design enables the delivery of compressed, filtered air and solvent to connector surfaces. A built-in MEMS pump sucks the air and solvent back to remove particles and contaminations without leaving residues and without scratching the connector surfaces. An interchangeable external needle allows the cleaner to quickly adapt to all kinds of fiber optic connectors. No disassembly is required. The connector cleaner is therefore both fast and effective at cleaning various male and female fiber optic connectors. The fiber optic connector cleaner with 3–5 cc solvent weighs less than half a pound and can be held and operated by one hand.

20 Claims, 3 Drawing Sheets

U.S. PATENT DOCUMENTS

| | | | |
|---|---|---|---|
| 2001/0033728 A1 | 10/2001 | Miyake et al. | 385/134 |
| 2002/0076140 A1* | 6/2002 | Kobrin | 385/18 |
| 2002/0166190 A1 | 11/2002 | Miyake et al. | 15/210.1 |
| 2003/0026549 A1* | 2/2003 | Ellis et al. | 385/53 |
| 2003/0169991 A1 | 9/2003 | Malevanets et al. | 385/134 |
| 2003/0221706 A1 | 12/2003 | Kiani et al. | 134/6 |
| 2003/0221710 A1 | 12/2003 | Young | 134/22.14 |
| 2003/0231967 A1 | 12/2003 | Najafi et al. | 417/322 |
| 2004/0005134 A1 | 1/2004 | Sun et al. | 385/134 |
| 2004/0013370 A1 | 1/2004 | Gerhard | 385/85 |
| 2004/0206120 A1* | 10/2004 | Yamamura | 65/31 |

OTHER PUBLICATIONS

Cletop Optical Fiber Connector Cleaner & Swabs, Jensen Tools, 1 page [Retrieved from the Internet on Jan. 24, 2005, <<URL: http://www.jensentools.com/product/group.asp?parent_id=9001>>].

Ultra SCC-3100 Connector Cleaner, Lightel Technologies, 1 page [Retrieved from the Internet on Jan. 24, 2005 <<URL: http://www.lighteltech.com/products/ProductDetail.asp?Id=134>>].

* cited by examiner

MEMS BASED HANDHELD FIBER OPTIC CONNECTOR CLEANER

FIELD OF THE INVENTION

The present invention relates generally to cleaning system and apparatus for fiber optic connectors and more particularly to an advanced, highly efficient, lightweight, low cost, portable fiber-optic connector cleaning system and apparatus useful for military and commercial fiber-optic communications applications such as fiber-optic cable plant maintenance.

DESCRIPTION OF THE BACKGROUND ART

Fiber optics has become the core of telecommunications and data networking infrastructures. To use optical fibers effectively for communications, demountable connections are required. A connector allows a demountable connection between fibers or between a fiber and a source or detector.

The most common design for fiber optic connectors uses precision ferrules to hold the optical fiber. The ferrule (terminus) on one side of a connection is held in a bushing/adapter (female side), which is secured inside an assembly or on a bulkhead. The other side (male) is pushed into the bushing/adapter to make the optical connection. In order for the connector to have low loss, the surfaces of the ferrules must be perfectly clean and free of obstructions that might otherwise block the light transmission. Cleanliness of fiber optic connectors is recognized as a basic requirement for the successful operation of optical networks.

A ferrule is a cylindrical part made of zirconia ceramics measuring 1.25 mm (MU type) or 1.6 mm (MIL-T-29504 terminus) or 2.5 mm (SC type) in diameter. Ferrules are manufactured with ultra-precision, and hold an optic fiber with a diameter of 0.125 mm or less.

Fiber optic connectors need to be cleaned every time they are mated and unmated. They also need to be mated or covered immediately after cleaning. Dust particles smaller than 1 µm can be suspended almost indefinitely in the air. A 1 µm dust particle landing on the core of a single-mode fiber, which can have a core size as small as 8–9 µm, can cause up to 1 dB of loss. 9 µm or larger dust particles can completely obscure the core of a single-mode fiber. As a point of reference, a typical human hair is about 50–75 µm in diameter.

The current approach for cleaning the optical fiber connector contains two parts: one for plug ferrule (male) and another for connector adapter (female). Commercially available cleaning tools are reasonably effective for cleaning the male form of a fiber-optic connector. The known CLETOP® optical fiber cleaner contains a spooled, woven-film cleaning cloth that is concealed by a shutter. The reel-type CELTOP cleaner is reasonably effective in cleaning the plug ferrules (male) of fiber connectors The stick-type CELTOP cleaner applies the same dry cloth as used in the reel-type. The stick-type CELTOP cleaner is used to clean connector ferrules in difficult to reach spots such as the inside of adapters.

Some existing fiber optic connecter cleaners have air and solvent delivery and removal systems. However, these prior cleaning systems are cumbersome and each usually weighs at least 10 pounds. They typically use mechanical pumps to produce compressed air to deliver solvent, vacuum pumps to produce vacuum to remove the waste solvent, and solenoid valves to control the process of the cleaning. These traditional pumps and valves are big and weigh more than a few pounds. They also need high electric power—a few hundred watts—to operate.

In view of the foregoing, there is a continuing need in the art for an efficient and effective fiber optic connector cleaner that can be made economically and that is lightweight, self-contained, and small in size. Such a fiber optic connector cleaner should be able to remove both particles and contaminants without scratching the fiber optic connector surfaces and without requiring that the connector be disassembled. It should be able to effectively and efficiently clean all types of fiber optic connectors, including male and female, and able to handle military MIL-T-29504 termini as well as standard fiber optic connectors in 1.25- and 2.5-mm diameters. The present invention addresses this need.

SUMMARY OF THE INVENTION

The present invention provides a MicroElectroMechanical System (MEMS) and double-layer nozzle based high efficiency, lightweight, low cost, compact, portable fiber-optic connector cleaning apparatus useful for various fiber optic communications applications such as fiber optic cable plant maintenance. The double-layer nozzle design enables the delivery of compressed, filtered air and solvent to connector surfaces. A built-in MEMS pump sucks the air and solvent back to remove particles and contaminations without leaving residues and without scratching the connector surfaces. An interchangeable external needle allows the cleaner to quickly adapt to all kinds of existing fiber optic connectors. No disassembly is required.

The connector cleaner is therefore both fast and effective at cleaning various male and female fiber optic connectors. The fiber optic connector cleaner with 3–5 cc solvent weighs only about 8 oz. or less and can be held and operated by one hand. Since the cleaner is relatively small and inexpensive, it can be considered a consumable item.

Still further objects and advantages of the present invention will become apparent to one of ordinary skill in the art upon reading and understanding the following detailed description and the drawings illustrating the preferred embodiments disclosed herein.

DETAILED DESCRIPTION

Figure 1:
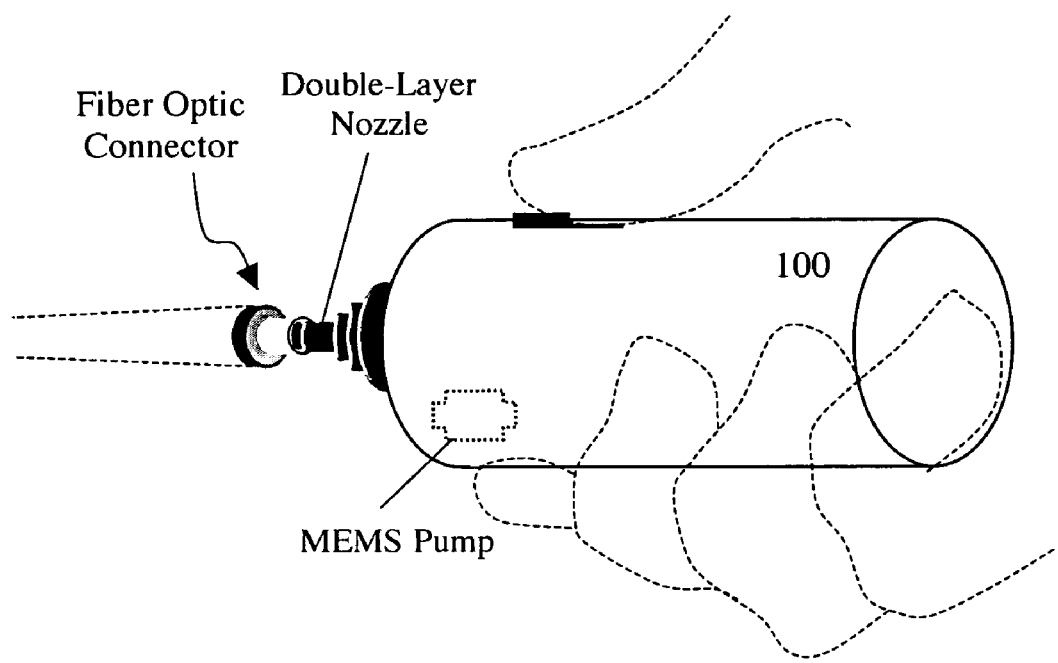
FIG. 1 shows a MEMS based handheld fiber optic connector cleaner with a double-layer nozzle according to an embodiment of the present invention.
Figure 2:
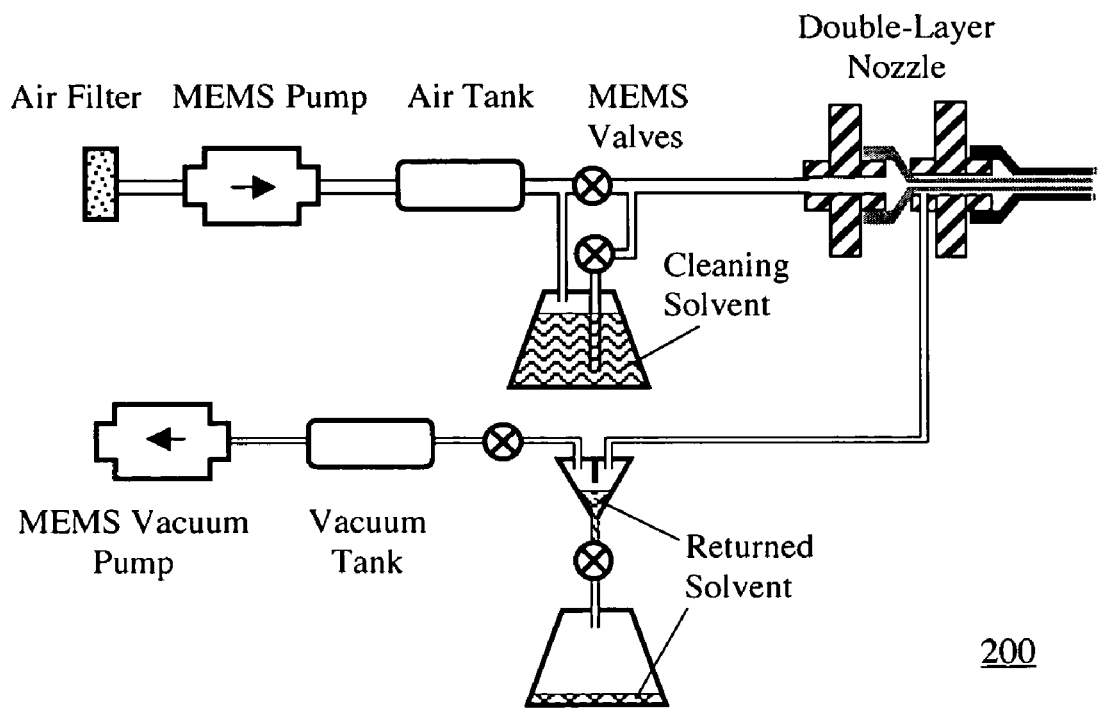
FIG. 2 diagrammatically shows a compact fiber optic connector cleaner with a double-layer nozzle, MEMS pumps, and MEMS valves, according to an embodiment of the present invention.

FIG. 1 shows an innovative, low-cost, light weight, high-efficiency, hand-held fiber optic connector cleaner 100. FIG. 2 shows an exemplary embodiment of a fiber optic connector cleaner 200 integrating components such as a double-layer nozzle, Micro-Electro-Mechanical System (MEMS) pumps, and MEMS valves. A fiber optic connector cleaning system and apparatus according to the present invention further comprises cleaning solvent, a solvent container, an air filter, an air tank, a vacuum tank, a returned solvent collector, a returned solvent container, a power supply (not shown), and a built-in computer system (not shown).

Double-Layer Nozzle

As one skilled in the art will appreciate, it is very expensive and extremely difficult to make a thin and long double-layer nozzle as a whole unit. What is more, once it is made, the whole unit is fixed in size and will only fit one particular size of fiber optic connectors. This would severely limits its applications and utility.

Figure 3:
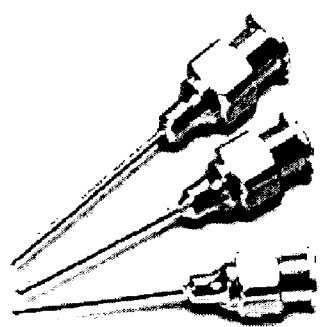
FIG. 3 shows three different sizes of hypodermic needles that can be utilized to implement the double-layer nozzle of the present invention.

To solve this problem, the double-layer nozzle of the present invention cleverly combines two different size medical hypodermic needles. The medical hypodermic needles, such as those shown in FIG. 3, are commercially available and very economically affordable.

The two needles are selected to have different dimensions so that the smaller one (internal needle) can be inserted into the larger one (external needle). The internal nozzle is for delivering compressed, filtered air and solvent to the end-surface of a fiber optic connector to be cleaned. Negative pressure (vacuum) is applied through the external annular nozzle to remove air and solvent, along with any loose particles, leaving the connector surface clean and dry.

The internal needle is fixed while the external needle can be readily detached. This allows the quick exchange of needles with different dimensions for fitting and adapting to various sized fiber optic connectors that need to be cleaned. As one skilled in the art will appreciate, changing the external needle of the double-layer nozzle would be as easy and fast as changing a needle of a syringe.

Figure 4:
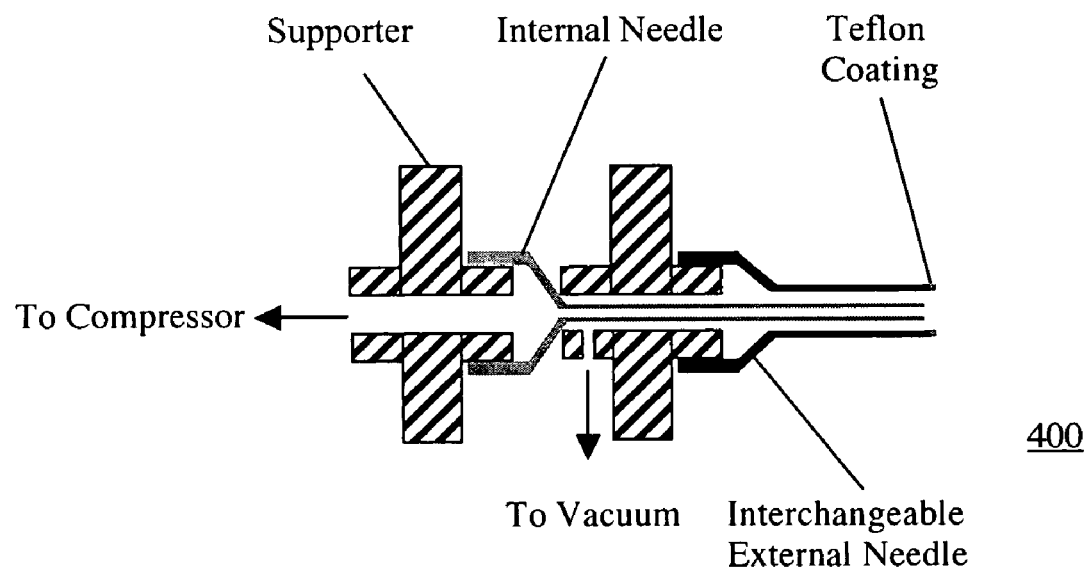
FIG. 4 is a schematic diagram illustrating the double-layer nozzle design that integrates two different size hypodermic needles according to an embodiment of the present invention.

FIG. 4 schematically shows the structure of a double-layer nozzle 400. The internal needle is suspended inside the tube of the external needle. Optionally, the tip (tube end) of the external needle can be coated with a soft, protective material, for instance, Teflon® or the like, to provide a soft contact with the outer edge or rim of the ferrule. Other than air and solvent, there is no direct contact between the double-layer nozzle and the end-surface of the ferrule. This prevents the nozzle from scratching the end-surface of the ferrule that embeds the optical fiber.

The wall of the internal needle is very thin, about 0.06 mm or less. The thin wall enables the tube of the internal needle to vibrate with high speed when the solvent is jetting therethrough. This ultrasonic cleaning effect caused by the high speed vibration significantly increases the cleaner's cleaning capacity, which is discussed below with reference to FIG. 5. In an embodiment, Popper™ gauge 21XXTW needle is selected as the internal needle having an outside diameter (O.D.) of 0.82 mm, inside diameter (I.D.) of 0.69 mm, and wall thickness of only 0.0635 mm.

Figure 5:
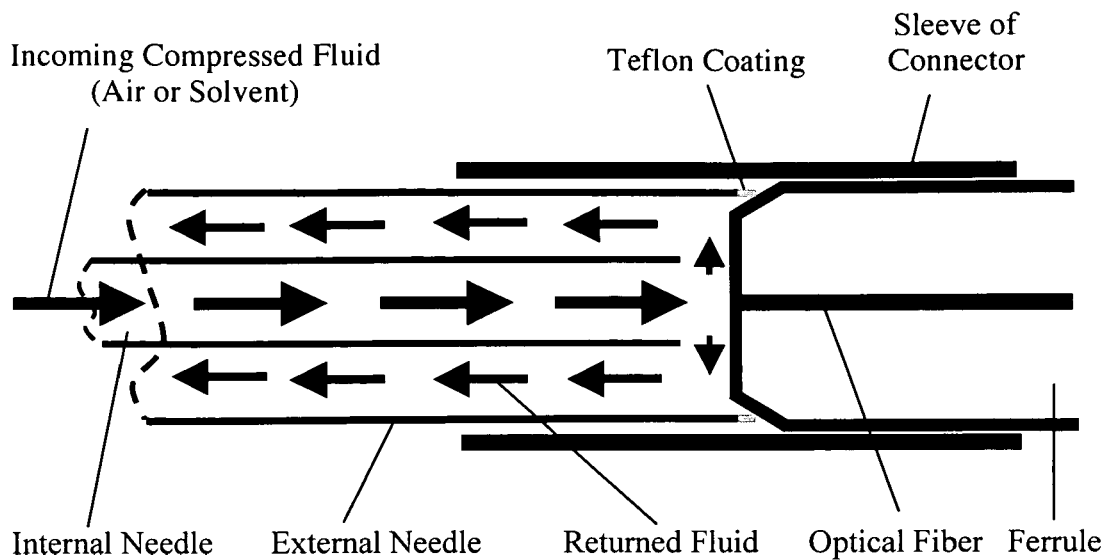
FIG. 5 illustrates a principle cleaning scheme according to the present invention wherein the double-layer nozzle deliveries air and/or solvent onto the end-surface of a ferrule.
Figure 6:
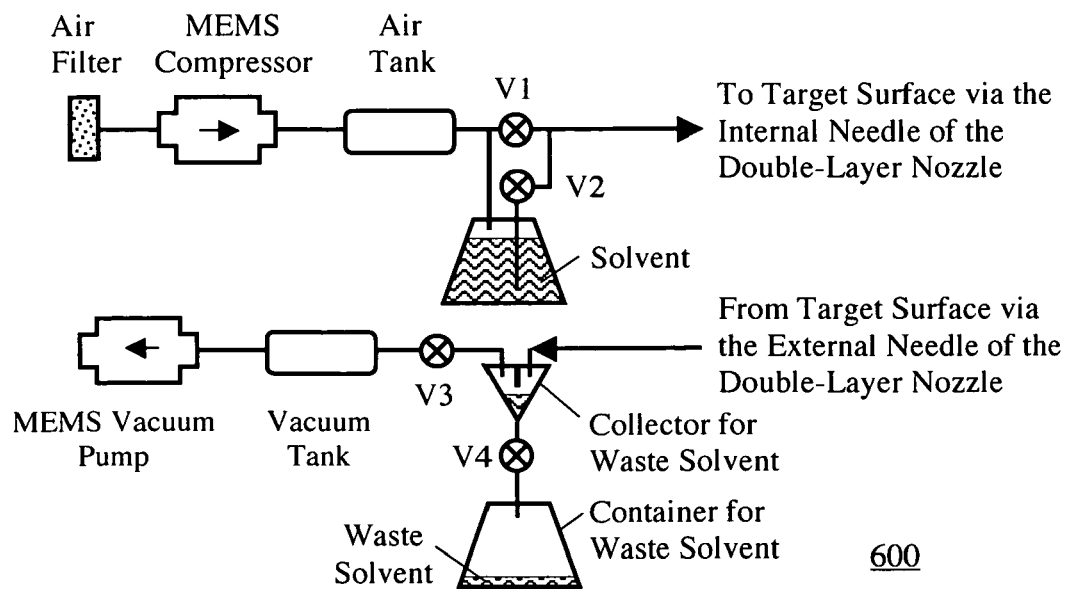
FIG. 6 is a schematic diagram illustrating an air and solvent delivery and removal system having MEMS pumps and MEMS valves, according to an embodiment of the present invention.

FIG. 5 shows the process of delivering and removing compressed air/solvent to and from the end-surface of an optical fiber. The filtered, compressed air or solvent is jetted from the internal needle of the double-layer nozzle to the end-surface of the ferrule. After cleaning the end-surface of the ferrule, the waste air or solvent with particles is sucked back by a MEMS Vacuum Pump through the external needle of the double-layer nozzle into the Collector for Waste Solvent Collection, as shown in FIG. 6. According to the principle of the invention, the cleaning process is completed in the very thin and tiny nozzle. The double-layer nozzle enables the fiber optic connector cleaner according to the present invention to be versatile and adaptive. It can clean all kinds of fiber optic connectors, including military type MIL-T-29504 termini and standard fiber optic connector ferrules. Table 1 below exemplifies three external needles in different sizes for three types of fiber optic connectors.

| Gauge of needle | Outside diameter | Connector Type | Diameter of ferrule |
|---|---|---|---|
| 18TW | 1.22 mm | MU Type | 1.25 mm |
| 17RW | 1.47 mm | MIL-T-29504 | 1.6 mm |
| 13HW | 2.41 mm | SC Type | 2.5 mm |

To clean a female (socket) connector, the nozzle is inserted directly into the connector. To clean a male (plug or pin) connector, a corresponding adaptor is used to make it a female connector. for example, a Glenair 38999 fiber optic test probe adapter can be used with the double-layer nozzle to clean 38999 fiber optic connectors.

MEMS Pumps and MEMS Valves

The term MEMS refers to the integration of micro-scale mechanical elements, sensors, actuators, and electronics on a common silicon substrate through microfabrication technology. Generally, the electronics are fabricated using integrated circuit (IC) process sequences (e.g., CMOS, Bipolar, or BICMOS processes) and the micromechanical components are fabricated using compatible "micromachining" processes that selectively etch away parts of the silicon wafer or add new structural layers to form the mechanical and electromechanical devices.

MEMS promises to revolutionize nearly every product category by bringing together silicon-based microelectronics with micromachining technology, making possible the realization of complete systems-on-a-chip. Because MEMS devices are manufactured using batch fabrication techniques similar to those used for integrated circuits, unprecedented levels of functionality, reliability, and sophistication can be placed on a small silicon chip at a relatively low cost. Additional advantageous features of MEMS devices include their small size, robust structure, and low electric dissipation.

MEMS based pumps and valves can be found in various small devices such as insulin pumps and wrist blood pressure monitors. The MEMS pump used in an insulin pump weights only a few grams and includes a pressure sensor. It needs only a few ten mill-watts electric power. The MEMS pump used in a wrist blood pressure monitor can compress air pressure up to 300 mmHg, which is high enough to deliver solvent according to an embodiment of the present invention. To that end, the size, weight and even cost of the fiber optic connector cleaner of the present invention are comparable to a wrist blood pressure monitor, which weighs approximately 7 oz. and usually costs less than a hundred US dollars.

FIG. 6 shows an air and solvent delivery and removal system 600 comprising MEMS pumps and valves (V1–V4). A packaged MEMS valve can have a few ten milliseconds on-off time. Before coming into the MEMS compressor, the air is filtered by a High Efficiency Particulate Air (HEPA)

filter, which can filter out particles with size larger than 0.2 µm in the air. HEPA filters are known in the art and thus are not further described herein. The compressed air, with pressure larger than 300 mmHg, is stored in an air tank. The air tank serves as a buffer and has a volume of about 0.5–1 $cm^3$.

The MEMS valves V1 and V2 control air and solvent, i.e., when V1 opens and V2 closes, the compressed and filtered air goes into the nozzle. In contrast, when V1 closes and V2 opens, the solvent goes into the nozzle.

The MEMS vacuum pump generates a negative pressure (vacuum) in a vacuum tank. The vacuum tank serves as a buffer and also has a capacity of 0.5–1 $cm^3$. Due to the negative pressure, when V4 closes and V3 opens, the air and/or waste solvent are sucked back from the nozzle. The air is then pumped out from the vacuum pump and the waste solvent is retained in the Collector for the Waste Solvent. When V3 closes and V4 opens, the waste solvent in the Collector, if any, flows into the Container for Waste Solvent.

To summarize, according to an aspect of the present invention, the MEMS pumps provide compressed air, solvent, and vacuum and the MEMS valves control the paths of air, solvent, and vacuum. They work in concert to deliver air and solvent to the end-surface of the ferrule and remove solvent and dust particles therefrom efficiently and effectively.

Solvent

Chemical solvent plays a very important role in cleaning fiber optic connectors. Only solvent dedicated for cleaning fiber optic connectors should be selected as the fiber optic cleaning solution for the fiber optic connector cleaner disclosed herein. The selected solvent should offer excellent solvency for organic and inorganic contamination, and should be conductive so it dissipates any polar bonds which might bind insoluble contamination to the end-surface of the ferrule. Moreover, the selected solvent must be non-flammable, generally non-toxic, and ozone-safe. Finally, the selected solvent must dry rapidly and residue free.

In some embodiments, the selected solvent is Micro Care solvent, which is engineered specifically to clean fiber connector end faces. Based on a proprietary azeotrope of DuPont Vertrel® specialty solvents, this material has been tailored for the difficult mixture of light organics, salts, insoluble grime and uncured epoxies often found on cable ends. The solvent has delivered spectacular cleaning results. The solvent is double-filtered to 0.2 microns and is water-free to four decimal places, so residues are never a problem. It offers excellent solvency for organic and inorganic contamination. The solvent is conductive so it dissipates any polar bonds which might bind insoluble contamination to the surface of the fiber. In addition, the ultra-dense Micro Care solvent lifts particulate so they can easily be rinsed away. The solvent dries quickly, avoiding "exploding connectors" which occur when light traversing a fiber boils residual alcohols trapped in a connector. In terms of health and safety, the solvent is nonflammable, generally non-toxic, ozone-safe, and carries a low global warming potential. According to the present invention, 0.02 cc solvent sufficiently cleans one connector. Thus, 3–5 cc solvent can clean about 150–250 fiber optic connectors.

Built-in Computer System

The cleaning process is controlled by a computer system built in the fiber optic connector cleaner of the present invention. The working flow is as follows. After turning on the power switch, the built-in computer system (computer) turns on both pumps. It then instructs pressure sensors to sense the pressures in both pumps. When the measured pressures meet the preset values, the computer notifies a user by, for example, making a sound or turning on a green or "READY" indicator light.

The user then positions the double-layer nozzle so that the nozzle gently contacts the ferrule of a fiber optic connector to be cleaned. Upon contact or receiving a signal from the user to start the cleaning process (e.g., the user pushes a "CLEAN" button), the computer opens the MEMS valves V1 and V4 and closes the MEMS valves V2 and V3.

In this manner, the compressed and filtered air is delivered to the surface of the fiber optic connector and the returned air pushes the waste solvent (if any) in the Collector for Waste Solvent into the Container for Waste Solvent, as shown in FIG. 6. The solvent is then jetted to the end-surface and the connector end-surface is cleaned.

The volume of the jetted solvent is dependent upon the opening time of the MEMS valve V2, which is determined by the equation:

Pressure of the compressed air×the opening time=preset constant.

Next, V1 opens again (with V2 closed), the air dries the cleaned surface. The computer then closes all MEMS valves V1–V4 and the cleaning process is finished. The green or "READY" light is on again or another sound is made to indicate that the system is ready for the next cleaning process (cycle) or to be turned off. The cleaning process and other related functions are controlled by a processor executing computer program instructions stored in an internal read-only-memory, such as an EPROM. The basic computer components and necessary programming techniques are known in the art and thus are not further described herein.

Power Supply and Power Consumption

The fiber optic connector cleaner of the present invention requires very low power supply—only two AA batteries are needed to operate. Power consumption is also very low—two AA batteries can last for 500–1000 cleanings or cleaning cycles. Solvent consumption is 0.02 cc per each cleaning cycle. The cost for each cleaning cycle is estimated to be less than one cent.

Advantages

The fiber optic connector cleaner according to the present invention has the following unique features and advantages:

Perform both chemical and mechanical cleaning functions, faster and more effective than conventional cleaning swab type of cleaners. Upon activation, the double-layer nozzle automatically delivers compressed, filtered air and solvent, and sucks them right back to remove particles and contaminants, leaving the end-surface of the ferrule clean and dry. The ultrasonic cleaning effect further increases the cleaning capacity thereof;

No scratching. Only air and solvent contact the connector end-surfaces. Soft coating covering the end tube of the double-layer nozzle slightly contact only the outer edge or rim of the ferrule;

Versatile, adaptive, and applicable to all kinds of fiber optic connectors, including military type MIL-T-29504 termini and standard fiber optic connector ferrules, due to the removable, interchangeable external needle of the double-layer nozzle design;

Fast and residue free as the solvent dries rapidly and removed by vacuum sucking; and Lightweight (less than half a pound), compact (handheld) and low cost (less than $100), due to affordable, small size double-layer nozzle structure and MEMS pumps and valves.

Although the present invention and its advantages have been described in detail, it should be understood that the present invention is not limited to or defined by what is shown or described herein. As one of ordinary skill in the art will appreciate, various changes, substitutions, and alterations could be made or otherwise implemented without departing from the principles of the present invention. Accordingly, the scope of the present invention should be determined by the following claims and their legal equivalents.

The invention claimed is:

1. A fiber optic connector cleaner, comprising:
   a double-layer nozzle combining hypodermic needles for delivering and removing compressed, filtered air and solvent to and from an end-surface of a ferrule of a fiber optic connector;
   Micro-Electro-Mechanical System (MEMS) pumps for compressing said filtered air and for retrieving by suction said compressed, filtered air and said solvent; and
   MEMS valves for controlling paths of said air, said solvent, and said suction.

2. The fiber optic connector cleaner of claim 1, wherein said hypodermic needles include an internal needle and an external needle;
   wherein said internal needle and said external needle have different dimensions; and
   wherein said internal needle is suspended inside a tube of said external needle.

3. The fiber optic connector cleaner of claim 2, wherein said internal needle is fixed and said external needle is detachable.

4. The fiber optic connector cleaner of claim 2, wherein said internal needle has a wall thickness of about 0.06 mm or less; and wherein
   said wall thickness enables a portion of said internal needle to vibrate in high speed when said air and said solvent are jetted therethrough, thereby causing an ultrasonic cleaning effect that significantly increases cleaning capacity of said fiber optic connector cleaner.

5. The fiber optic connector cleaner of claim 1, wherein a tip of said external needle is coated with a soft, protective coating material.

6. The fiber optic connector cleaner of claim 1, wherein said external needle is adaptive to ferrules having 1.25 mm, 1.6 mm, or 2.5 mm diameters.

7. The fiber optic connector cleaner of claim 1, wherein said fiber optic connector cleaner weighs less than 8 oz.

8. The fiber optic connector cleaner of claim 1, wherein said MEMS pumps are capable of generating 300 mmHg or more pressure.

9. The fiber optic connector cleaner of claim 1, wherein one of said MEMS pumps functions as a compressor, further comprising:
   a high efficiency particulate air filter for providing said filtered air to said compressor.

10. The fiber optic connector cleaner of claim 1, wherein one of said MEMS pumps functions as a vacuum pump, further comprising:
    a vacuum tank for facilitating said vacuum pump creating said suction.

11. The fiber optic connector cleaner of claim 1, further comprising:
    built-in pressure sensors for sensing and measuring pressures generated by said MEMS pumps.

12. The fiber optic connector cleaner of claim 1, further comprising:
    a plurality of containers for holding or collecting said compressed, filtered air, said solvent, and returned solvent.

13. The fiber optic connector cleaner of claim 12, wherein two of said containers have the same volume of about 0.5–1 $cm^3$.

14. The fiber optic connector cleaner of claim 1, further comprising:
    a built-in computer system for controlling said MEMS pumps and said MEMS valves such that said double-layer nozzle, said MEMS pumps, and said MEMS valves work in concert to deliver said air and said solvent to said end-surface and remove said solvent and dust particles down to 0.2 μm therefrom in an efficient and effective manner.

15. The fiber optic connector cleaner of claim 1, wherein consumption of said solvent is 0.02 cc per cleaning.

16. The fiber optic connector cleaner of claim 1, further comprising:
    a built-in power supply composed of two AA batteries;
    wherein said fiber optic connector cleaner, operating on said batteries, is capable of performing 500–1000 or more cleanings.

17. The fiber optic connector cleaner of claim 1, further comprising:
    a housing means for containing said double-layer nozzle, said MEMS pumps, and said MEMS valves.

18. A method of operating the fiber optic connector cleaner of claim 1, said method comprising:
    instructing pressure sensors to sense and measure pressures in said MEMS pumps;
    indicating that said fiber optic connector cleaner is ready to clean or be turned off;
    receiving an instruction to begin cleaning said fiber optic connector;
    opening and closing said MEMS valves individually and correspondingly such that said compressed, filtered air and said solvent jet through an internal needle of said double-layer nozzle to clean said end-surface of said ferrule, wherein a volume of said solvent being jetted through is controlled per a predetermined constant, and wherein returned air pushes applicable waste solvent and dust particles through an external needle of said double-layer nozzle into a container;
    closing all of said MEMS valves; and
    indicating that said cleaning is finished.

19. The method according to claim 18, further comprising:
    turning on said MEMS pumps.

20. A computer-readable medium storing a computer program implementing the method according to claim 18.

* * * * *